United States Patent Office 2,985,685
Patented May 23, 1961

2,985,685
ALKANOLAMINE ALUMINATES AS CATALYSTS FOR ESTER REDISTRIBUTION

Walter M. Thomas, Noroton Heights, Conn., Stephen J. Groszos, Naperville, Ill., and Nancy E. Day, Greenwich, Conn., assignors to American Cyanamid Company, New York, N.Y., a corporation of Maine No Drawing. Original application Jan. 26, 1959, Ser. No. 788,753. Divided and this application May 2, 1960, Ser. No. 25,907

4 Claims. (Cl. 260—485)

This invention relates broadly to organometallic compounds. More particularly it relates to organometallic esters, specifically aluminum esters of certain aminoalcohols hereinafter described.

A primary object of the invention is to provide new and useful aluminum compounds for use in industry.

A further object of the invention is to provide organic compounds of aluminum which are soluble in common organic solvents.

Still another object of the invention is to provide compounds which are useful, for example, as catalysts for ester redistribution.

Other objects of the invention will be apparent to those skilled in the art from the following more detailed description of the invention.

The foregoing and other objects of the invention are attained by preparing aluminum esters selected from the class consisting of (a) aluminates represented by the general formula (I)
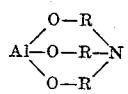

where R represents an alkylene radical containing from 2 to 6 carbon atoms, inclusive, and (b) aluminates of N,N,N',N'-tetrakis(2-hydroxypropyl)ethylenediamine. More specific examples of the aluminates of (a) are the aluminates of triethanolamine, tripropanolamine and triisopropanolamine. Such esters can be prepared, for example, by reacting an aluminum isopropoxide with an aminoalcohol corresponding to the desired ester from the above-described class, thereby to obtain the resulting ester product. If desired, the aluminum ester can be recovered from the ester product initially obtained by removing the isopropanol by-product of the reaction, e.g., by distillation.

No pertinent prior art is known. Patent No. 2,253,399 discloses lubricating oil compositions containing approximately 1% by weight thereof of aluminum stearate and a quantity of triethanolamine, in the range of about 5% to about 20% by weight of the aforesaid aluminum stearate, sufficient to improve the lubricating efficiency of the oil. The patentees suggest that "an aluminum stearate-triethanolamine complex" may be formed "along with which may be some proportion of the respective compounding igredients as added." Patent No. 2,253,585 is similar to 2,253,399 but contains a broader disclosure with respect to the aluminum soap and alkanolamine employed. Patent No. 2,258,718 discloses various esters of ortho inorganic acids of aluminum (as well as of titanium and tin) with alpha,beta-unsaturated, non-nitrogen-containing, unsaturated, primary alcohols, e.g., allyl, methallyl, crotonyl, furfuryl, tiglyl, propargyl and other primary alcohols having unsaturation between the carbon atoms which are alpha and beta to the carbinol. Patent No. 2,480,743 discloses basic aluminum salts obtained by reacting an aluminum alcoholate with an aliphatic amino-acid. Patent No. 2,643,228 discloses that a hydrocarbon-soluble complex is formed when an aluminum fatty acid salt is condensed with an alkanolamine. In none of these patents, nor in any other known prior art, is there any disclosure or suggestion of preparing aluminum esters containing basic nitrogen groups and having in common a nitrogen-to-aluminum coordinate bond as do the aluminum compounds of the present invention.

In order that those skilled in the art may better understand how the present invention can be carried into effect the following examples are given by way of illustration and not by way of limitation. All parts and percentages are by weight unless otherwise stated.

EXAMPLE 1

*Preparation of triethanolamine aluminate*

(II)
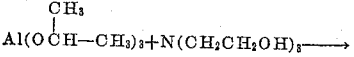

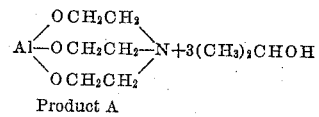

Product A

A mixture of 30.6 g. (0.15 mole) aluminum isopropoxide, 22.4 g. (0.15 mole) triethanolamine and about 150 ml. of dry toluene (or benzene) is refluxed under distillation conditions in a 3-necked, round-bottomed flask fitted with stirrer, nitrogen inlet, thermometer, Dean and Stark trap, condenser, and drying tube. Refluxing and distillation are continued until the isopropanoltoluene (benzene) azeotrope ceases to come over (28 g. isopropanol; 101% of theory). During heating, the solution changes from yellow to amber to green. On cooling to room temperature, the color changes to yellow and a solid separates. The product is filtered, washed with benzene, triturated, washed with chloroform, and pumped dry. Yield 24.6 g. (94.6% theory). The white, crystalline product comprising the aluminate of triethanolamine does not melt below 300° C. It begins to turn yellow at 160° C. and is a brown powder at 300° C. A saturated solution of the product in water has a pH of 8.5. The product is recrystallized from toluene-hexane. The infrared spectrum agrees with that of the structure shown in Equation II and there identified as "Product A."

*Analysis.*—Calc'd. for $C_6H_{12}O_3NAl$, percent: C, 41.6; H, 6.98; N, 8.09. Found, percent: C, 41.45; H, 7.35; N, 7.86.

EXAMPLE 2

*Preparation of triisopropanolamine aluminate*

(III)
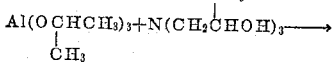

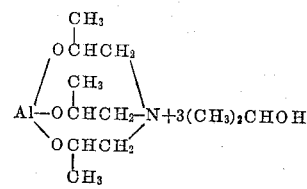

In a manner similar to that followed in Example 1, 40.8 g. (0.2 mole) aluminum isopropoxide is reacted with 38.24 g. (0.2 mole) triisopropanolamine in benzene. Refluxing and distillation are continued until the isopropanol-benzene azeotrope ceases to come over (42 g. isopropanol, 118% of theory). On cooling to room temperature, 53.3 g. (123% of theory, moist with solvent) of colorless needles and an oil separate.

The product oils out on attempted recrystallization.

The product sublimes at 200° C./1.5 mm. All of the product is purified by sublimation.

The product comprising the aluminate of triisopropanolamine partially melts at 80°–100° C. and finally melts completely at 195°–200° C. A concentrated solution of the product in water forms a gel, pH 8.5.

*Analysis.*—Calc'd. for $C_9H_{18}O_3NAl$, percent: C, 50.23; H, 8.43; N, 6.56. Found, percent: C, 51.27; H, 9.72; N, 6.54.

EXAMPLE 3

*Condensation of aluminum isopropoxide with N,N,N',N'-tetrakis(2-hydroxypropyl)ethylenediamine ("Quadrol")*

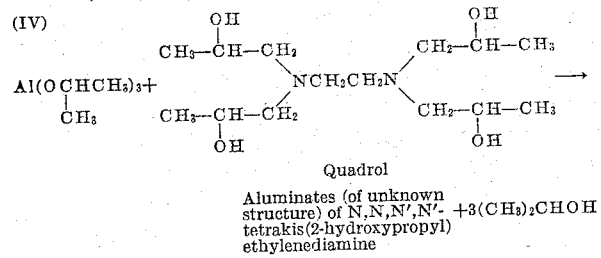

A mixture of 20.4 g. (0.1 mole) aluminum isopropoxide and 29.2 g. (0.1 mole) Quadrol is heated to 130°–140° C. in the apparatus described in Example 1. Heating is discontinued when isopropanol ceases to come over (30 ml.; 97% theory). On cooling to room temperature, a solid forms in the flask. The product oils out on attempts at recrystallization. All the solvent is stripped off in vacuo, yielding a colorless, brittle solid comprising aluminates of N,N,N',N'-tetrakis(2-hydroxypropyl)ethylenediamine. The pH of a concentrated water solution of this solid is 9.5–10.0. The softening point of the product is 95° C., and continued heating results in a glass comprising more highly condensed polymers of the aluminates of Quadrol that were thusly heated.

The term "aluminates to N,N,N',N'-tetrakis(2-hydroxypropyl)ethylenediamine," as used generically herein and in the appended claims, includes within its meaning both the monomeric and polymeric forms of the said aluminates unless specific reference is made to one or the other of these forms.

EXAMPLE 4

Example 1 is repeated exactly with the exception that 0.15 mole of tri-n-hexanolamine is employed instead of 0.15 mole of triethanolamine. The infrared spectrum of the product agrees with that of an aluminum ester having the structure

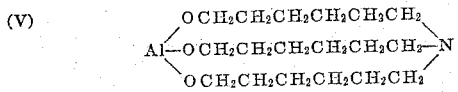

One method of preparing tri-n-hexanolamine is illustrated by the following equation

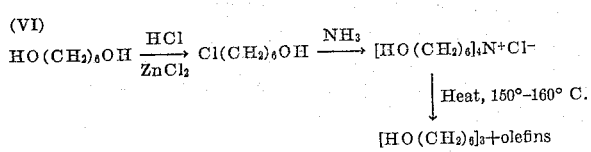

Instead of the specific N-trialkanolamines employed in the foregoing examples, one can use the normal or isomeric forms of any of the other N-trialkanolamines containing from 2 to 6 carbon atoms in each of the alkanol groupings as a reactant with aluminum isopropoxide in preparing the aluminum esters of this invention, using approximately equimolar proportions of the aforesaid reactants or with the one slightly in excess of the other. Or, stoichiometric proportions of reactants can be used, e.g., in preparing the aluminates of Quadrol.

EXAMPLE 5

This example illustrates one use of aluminates of the kind embraced by Formula I and of aluminates of N,N,N',N'-tetrakis(2-hydroxypropyl)ethylenediamine, namely, as catalysts for ester redistribution.

Dimethyl oxalate, 6.37 g. (0.0544 mole), di-n-butyl oxalate, 11.0 g. (0.0544 mole), and triisopropanolamine aluminate, 0.860 g. (0.004 mole) are charged into a flask and heated at reflux for five hours. At the end of this time the mixture is cooled in an ice bath, shaken with dilute hydrochloric acid, and the ester layer separated. The ester layer is washed with a dilute aqueous solution of sodium bicarbonate. The aqueous layer is washed with ether. The ester and ether layers are combined and dried over sodium sulfate. A fractional distillation is run to separate the components. The cuts obtained indicate three products. Hence it properly may be assumed that the reaction proceeds in accordance with the following equation:

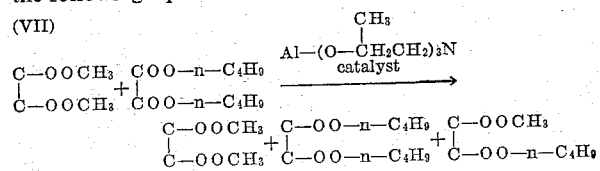

As more conclusive proof of the formation of methyl n-butyl oxalate (to distinguish it from a physical admixture of dimethyl oxalate and di-n-butyl oxalate), a small amount of the total product is separated by gas phase chromatography. The results show that three compounds are present in the final product.

EXAMPLE 6

Example 5 is repeated exactly with the exception that no triisopropanolamine aluminate is employed as a catalyst; i.e., a "blank" test is carried out for purpose of comparison. No redistribution takes place.

In the preferred method of preparing the aluminates of the present invention approximately equimolar proportions of the alkanolamine and of the aluminum isopropoxide are employed. The reaction is conveniently effected under reflux at the boiling temperature of the reaction mass. It is not necessary that the resulting aluminate be isolated from the reaction mass, since the isopropanol solution or dispersion of the aluminate can be used as such for many applications, e.g., as a thickening agent.

In addition to their use as catalysts, e.g., as catalysts for ester redistribution, the aluminates of the instant invention also may be useful as textile-treating agents, e.g., in treating wool, rayons, cotton, and the various synthetic fibers including the polyester fibers (e.g., Dacron polyester fiber), the polyacrylonitrile fibers (e.g., Creslan, Orlon, and Acrilan acrylic fibers), nylon and other polyamide fibers, etc., and the like, to improve the useful properties thereof. They also may be used in various cosmetic formulations; as additives to paint, varnishes and other coating and impregnating compositions; as dispersing agents; and as curing agents for certain epoxy resins.

This application is a division of our copending application Serial No. 788,753, filed January 26, 1959, and now abandoned.

We claim:

1. In a method of effecting ester redistribution between two different organic diesters, the improvement which consists in using as a catalyst for effecting said ester redistribution an aluminum ester selected from the class consisting of (*a*) aluminates represented by the general formula

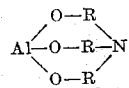

where R represents an alkylene radical containing from 2 to 6 carbon atoms, inclusive, and (b) aluminates of N,N,N',N'-tetrakis(2-hydroxypropyl)ethylenediamine.

2. In a method as in claim 1 the improvement which consists in using as a catalyst the aluminate of trisisopropanolamine.

3. In a method of effecting ester redistribution in a reaction between dimethyl oxalate and di-n-butyl oxalate, the improvement which consists in using as a catalyst for said ester redistribution the aluminate of trisisopropanolamine.

4. In a method of effecting ester redistribution between two different diesters of an organic dicarboxylic acid, the improvement which consists in using as a catalyst for effecting said ester redistribution an aluminum ester selected from the class consisting of aluminates represented by the general formula

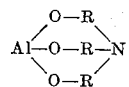

where R represents an alkylene radical containing from 2 to 6 carbon atoms, inclusive.

References Cited in the file of this patent

Calinqaert et al.: "Journal of The American Chemical Society," vol. 62, No. 6, pp. 1545–1547 (June 1940).

Starke: "J. Inorg. Nucl. Chem.," vol 6, pp. 130–133 (1958).